United States Patent [19]

Kinzer et al.

[11] 4,405,456
[45] Sep. 20, 1983

[54] CLARIFIER APPARATUS

[75] Inventors: Jay Kinzer, Denver; John W. Clingman, Aurora, both of Colo.

[73] Assignee: Sanilogical Corporation, Denver, Colo.

[21] Appl. No.: 296,019

[22] Filed: Aug. 25, 1981

[51] Int. Cl.³ ............................................. C02F 3/20
[52] U.S. Cl. ................................. 210/195.4; 210/197; 210/202; 210/220
[58] Field of Search .................. 210/195.4, 195.3, 197, 210/199, 200–202, 220, 258

[56] References Cited

U.S. PATENT DOCUMENTS

| | | | |
|---|---|---|---|
| 3,694,353 | 9/1972 | Yang et al. | 210/197 |
| 3,809,245 | 5/1974 | Kennedy | 210/220 |
| 3,828,933 | 8/1974 | Hampton et al. | 210/220 |
| 4,104,167 | 8/1978 | Besik | 210/220 |
| 4,142,975 | 3/1979 | Kinzer | 210/220 |

*Primary Examiner*—Benoit Castel
*Attorney, Agent, or Firm*—Klaas & Law

[57] ABSTRACT

A two stage clarifier apparatus for producing a clarified effluent from mixed liquor in a sewage treatment system wherein mixed liquor is partially clarified in a first quiescent zone in the first stage of the apparatus to produce a partially clarified effluent, the partially clarified effluent is transferred to an aeration zone in the second stage of the apparatus, a portion of the partially clarified effluent is transferred from the aeration zone to a second quiescent zone in the second stage of the apparatus, and fully clarified effluent is withdrawn from the second quiescent zone.

6 Claims, 4 Drawing Figures

CLARIFIER APPARATUS

BACKGROUND AND SUMMARY OF THE INVENTION

This invention relates to solids/liquids separators, and more particularly to a two stage clarifier apparatus for separating solids from mixed liquor in a sewage treatment system to produce a clarified effluent.

The effluent from sewage treatment systems is commonly treated to remove solids and to produce a clarified effluent prior to disposal of the effluent, such as by releasing the effluent into the environment. Typical conventional clarifier apparatus devices include filtration devices, e.g. in a fixed bed filtration system such as that described in U.S. Pat. No. 4,008,159 of Besik, and settling basins such as that described in U.S. Pat. No. 4,081,368 of Block et al. In addition, sewage treatment apparatus is disclosed in my prior U.S. Pat. Nos. 4,142,975 and 4,238,338 which includes a quiescent zone associated with the discharge end of the apparatus wherein solids are settled from liquids in the quiescent zone to produce a clarified effluent.

Although each of the foregoing devices have met some degree of success in accomplishing their intended purposes, it has been determined that higher degrees of effluent clarification can be readily and economically obtained in a two stage clarifier apparatus having tank means defining a first quiescent zone, inlet means for supplying mixed liquor from the sewage treatment system to the first quiescent zone, second tank means defining a chamber, baffle means in the chamber for separating the chamber into an aeration zone and a second quiescent zone, first fluid communication means for withdrawing partially clarified effluent from an upper portion of the first quiescent zone and supplying the partially clarified effluent to the aeration zone in the treatment chamber of the second tank means, second fluid communication means providing fluid communication between a lower portion of the aeration zone and a lower portion of the second quiescent zone, and outlet means for withdrawing clarified effluent from an upper portion of the second quiescent zone.

BRIEF DESCRIPTION OF THE DRAWINGS

The inventive concepts may be more fully understood in association with the accompanying drawings, in which.

DESCRIPTION OF THE INVENTION

Figure 1:
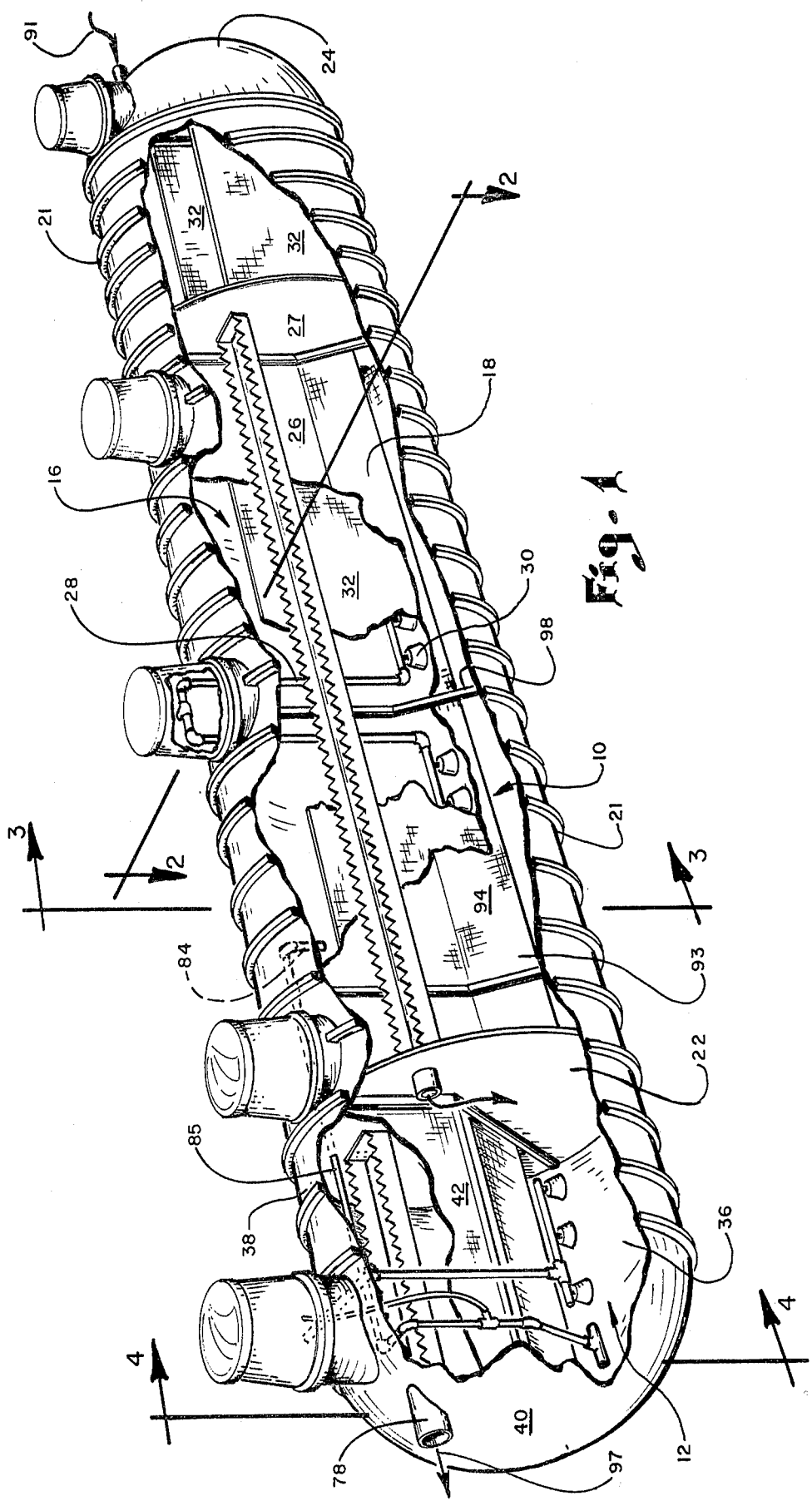
FIG. 1 is a perspective view of one presently particularly preferred embodiment of the two stage clarifier apparatus of the invention, with portions removed, as used in association with one type of sewage treatment system.
Figure 2:
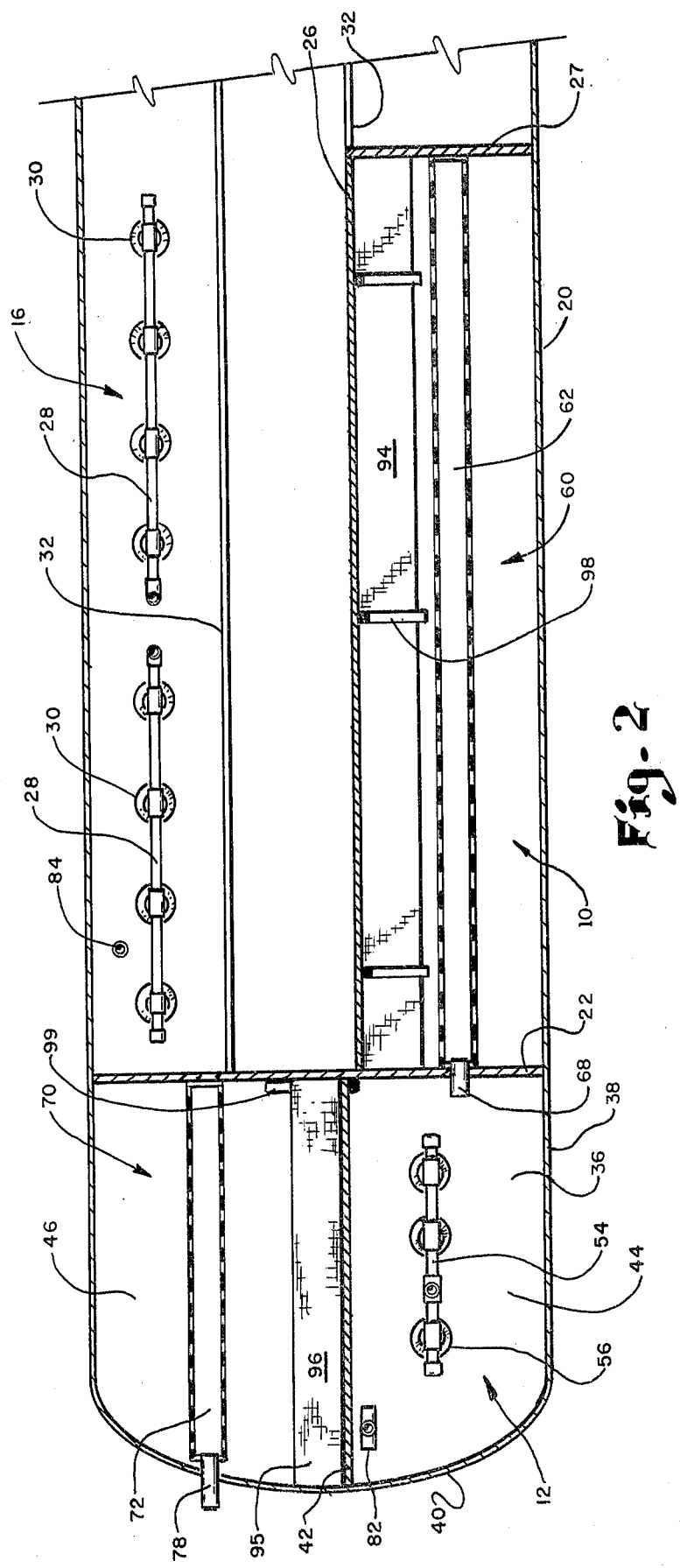
FIG. 2 is a top view in cross-section of the apparatus of FIG. 1, taken along the line 2—2 in FIG. 1.
Figure 3:
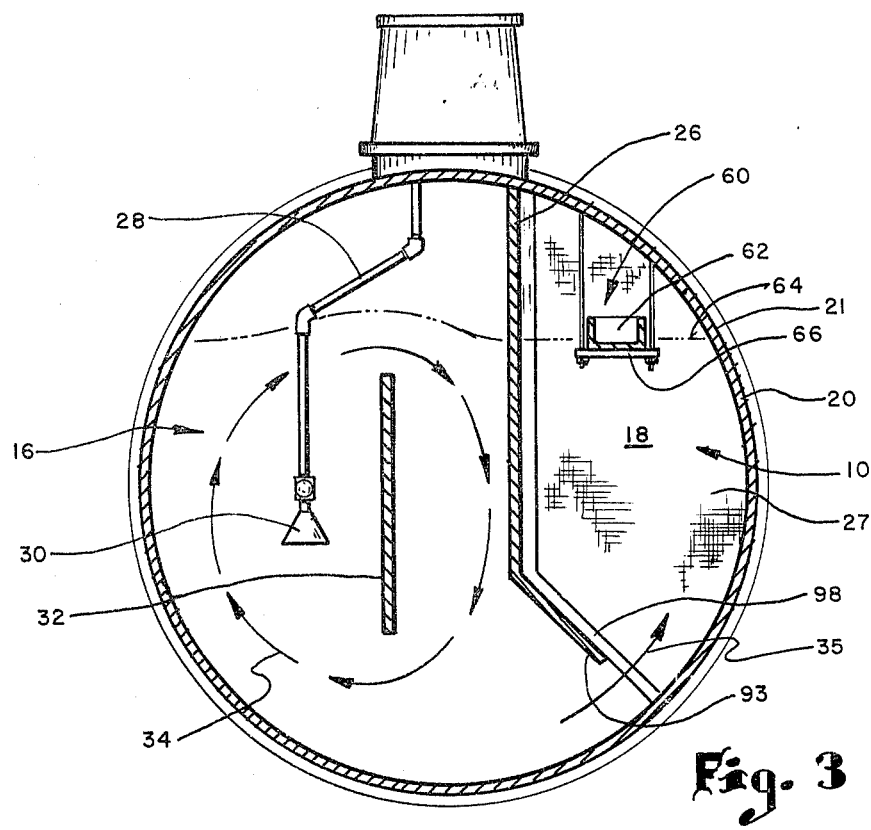
FIG. 3 is an end view in cross-section of a portion of the apparatus of FIG. 1, taken along the line 3—3 in FIG. 1.

Referring now to the drawings, the clarifier apparatus of the invention is shown to comprise a first stage, generally shown at 10, and a second stage, generally shown at 12. In the presently particularly preferred embodiment shown in the drawings, the two stage clarifier apparatus of the invention is illustrated as used in connection with a multiple stage, extended oxidation sewage treatment system, such as that described in U.S. Pat. No. 4,142,975. Thus, as shown in FIGS. 1—3, the fourth stage, for example, of the sewage treatment system is generally shown at 16. It is to be understood, however, that the two stage clarifier apparatus of the invention may be readily utilized in connection with other sewage treatment systems.

The first stage 10 of the clarifier apparatus comprises first tank means, defining a first quiescent zone 18, for containing mixed liquor from the sewage treatment system. In the illustrated embodiment, the first tank means comprises a tank having a generally circular sidewall 20, an end wall 22, and an end wall 24, which is shown in FIG. 1 to have a generally hemispherical configuration and to be integrally formed with the sidewall 20. The circular sidewall 20 may be provided with structural reinforcing ribs 21, as desired. Baffle means, such as baffle 26 and first quiescent zone end wall 27, is provided in the first tank means for separating the inside of the first tank means into first quiescent zone 18 and the fourth stage 16, for example, of the sewage treatment system. In the embodiment of FIGS. 1, 2 and 3, baffle 26 extends longitudinally from end wall 22 to first quiescent zone end wall 27, and vertically downwardly from an upper portion of the sidewall to a lower, intermediate area in the first tank means. The first quiescent zone end wall 27 extends transversely across the first tank means in an area intermediate the tank end walls 22, 24 from the tank sidewall 20 to the baffle 26, and vertically downwardly from an upper portion of the sidewall at the top of the tank to a lower portion of the tank sidewall at the bottom 5 of the tank. As more fully described in U.S. Pat. No. 4,142,975, an oxygen containing gas is supplied to the fourth stage 16 of the sewage treatment system, such as through supply conduit 28, and is dispersed into mixed liquor in the fourth stage of the treatment system, such as through dispersing nozzles 30, in a manner so as to cause a rapid movement and uniform mixing of mixed liquor in the fourth stage. Flow directing baffles 32 may be provided in the fourth stage to direct the movement of the mixed liquor in the fourth stage in a path generally represented by arrows 34 in FIG. 3.

The first stage of the clarifier apparatus further comprises inlet means for supplying mixed liquor from the sewage treatment system to the first quiescent zone 18. In the embodiment illustrated in the drawings, the inlet means is provided by baffle 26 which terminates above the lower portion of sidewall 20, thereby providing fluid communication between the fourth stage 16 of the sewage treatment system and the quiescent zone 18. As mixed liquor or other liquids are added to the fourth stage 16 of the sewage treatment system, a portion of the mixed liquor in the fourth stage 16 is forced under the baffle 26 and into the quiescent zone, as generally represented by arrow 35 in FIG. 3.

Figure 4:
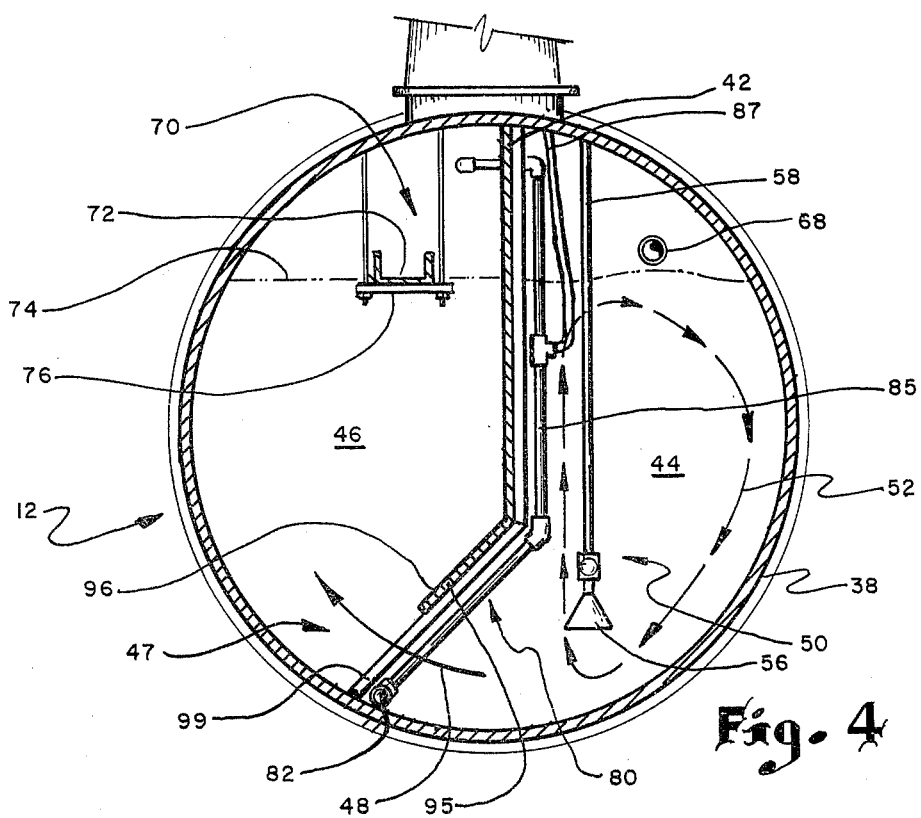
FIG. 4 is an end view in cross-section of a portion of the apparatus of FIG. 1, taken along the line 4—4 in FIG. 1.

Referring now to FIGS. 1, 2 and 4, the second stage 12 of the clarifier apparatus comprises a second tank means defining a chamber 36, for receiving partially clarified effluent from the first tank means and for effecting further clarification of the effluent. The second tank means may be formed, for example, by sidewall 38, having a generally circular cross-sectional configuration, by end wall 22, and by end wall 40, which is shown in FIG. 1 to have a generally hemispherical configuration and to be integrally formed with the sidewall 38. The second stage of the clarifier apparatus further comprises baffle means, such as baffle 42 in the chamber 36 extending longitudinally from end wall 22 to the end wall 40, and from an upper portion of the sidewall 38 vertically downward to a lower intermediate area of the chamber 36, for separating the chamber 36 into a first aeration zone 44 and a second quiescent zone 46. Fluid communication means 47 is provided in the second stage of the clarifier apparatus for providing fluid communication between the aeration zone and the second quiescent zone. In the embodiment illustrated in FIGS. 1, 2 and 4, fluid communication means 47 comprises baffle 42 which terminates at its lower end somewhat above and spaced from the lower portion of tank side wall 38. Thus, as partially clarified effluent is supplied to aeration zone 44, as will be hereinafter further described, a portion of the liquids in the aeration zone pass under the baffle 42 in a path generally represented by arrow 48.

The second stage of the clarifier apparatus further comprises gas supply means 50 for supplying an oxygen containing gas to the aeration zone at a location intermediate the baffle 42 and the tank sidewall 38 in an intermediate lower portion of the aeration zone. The gas supply means is located in relationship to the aeration zone so as to provide an adequate supply of oxygen to partially clarified effluent in the aeration zone to ensure aerobic metabolism of any microorganisms which may be located therein and to cause partially clarified effluent in the aeration zone to rapidly rise vertically upward in the aeration zone adjacent the baffle 42 and then circumferentially outward and downward in a continuous semicircular pathway, generally indicated by arrows 52 in FIG. 4 to the bottom of the aeration zone and then vertically upward again, thereby causing a uniform, intimate and thorough mixing of the oxygen containing gas throughout the partially clarified effluent in the aeration zone and maintaining any solid, particulate matter and microorganisms in generally uniform suspension in the partially clarified effluent in the aeration zone. As best shown in FIGS. 2 and 4, the gas supply means 50 comprises a conduit 54 horizontally mounted in a lower intermediate portion of the aeration zone. The conduit 54 is provided with a plurality of diffusers 56 spaced along the conduit 54 for diffusing an oxygen containing gas in the conduit into partially clarified effluent in the aeration zone. The gas supply means further comprises means for supplying an oxygen containing gas to the conduit under pressure, such as a pump (not shown), and an interconnecting conduit, such as conduit 58, for providing fluid communication between the pump and the conduit 54.

The two stage clarifier apparatus of the invention further comprises fluid communication means 60 for withdrawing partially clarified effluent from an upper portion of the first quiescent zone 18 and supplying the partially clarified effluent to the aeration zone 44 of the second stage of the apparatus. In the embodiment illustrated in FIGS. 1, 2 and 3, fluid communication means 60 comprises a weir 62 extending longitudinally across an upper portion of the first quiescent zone 18 substantially from end wall 22 to first quiescent zone end wall 27 at about the upper liquid level 64 in the first quiescent zone. The weir 62 may be mounted in the first aeration zone by means of straps 66, or by other suitable means. A conduit 68 is provided extending through the end wall 22 and providing fluid communication between the weir 62 and aeration zone 44 in the second stage of the apparatus so that partially clarified effluent in the weir 62 is allowed to freely flow into the aeration zone of the second stage of the clarifier apparatus.

The two stage clarifier apparatus further comprises outlet means 70 for withdrawing clarified effluent from an upper portion of the second quiescent zone 46. In the embodiment illustrated in FIGS. 1, 2 and 4, outlet means 70 comprises a weir 72 extending longitudinally across an upper portion of the second quiescent zone 46 substantially from end wall 22 to end wall 40 at about the upper liquid level 74 in the second quiescent zone. The weir 72 may be mounted in the second quiescent zone 46 by means of straps 76, or by other suitable means. A conduit 78 is provided extending through end wall 40 and providing fluid communication between the weir 72 and the outside of the apparatus, thereby permitting suitable subsequent disposal of clarified effluent discharged from the weir 72.

In a presently particularly preferred embodiment, the apparatus may additionally comprise transfer means 80 for transferring a portion of the liquids and/or retained solids in a lower portion of the aeration zone back to the sewage treatment system. In the illustrated embodiment, transfer means 80 comprises an airlift pump having an inlet 82 in a lower portion of the aeration zone 44, such as adjacent a lowermost area of sidewall 38 as shown in FIG. 4, an outlet 84 in the fourth stage 16 of the sewage treatment system, and interconnecting conduit means 85 for providing fluid communication between inlet 82 and outlet 84. A suitable gas, such as air, is introduced into an intermediate portion of the conduit means 85, such as from a pump (not shown) through gas supply tube 87 and junction-T 87, to lift liquids and/or retained solids through airlift pump inlet 82 and carry the liquids and/or solids out of outlet 84. In this manner, solid materials which might otherwise build up in the second stage of the clarifier apparatus may be continuously or intermittantly recycled and returned to the sewage treatment system for further biological treatment.

In operation, mixed liquor which has been subjected to biological and/or chemical treatment in earlier stages, such as first, second and third stages (not shown), for example, of the sewage treatment system, is introduced into the fourth stage 16 of the treatment system through a conduit as indicated by arrow 91. In the fourth stage of the sewage treatment system, mixed liquor is maintained in continuous movement in the flow path indicated by arrows 34 due to the action of the oxygen containing gas dispersed into the mixed liquor through nozzles 30 and to the flow path guidance provided by baffles 26, 32 and by first tank means sidewall 20. A sufficient amount of oxygen containing gas is supplied to the fourth stage 16 of the sewage treatment system to maintain solids in substantially uniform suspension in the mixed liquor in the fourth stage 16 and to provide substantially constant, uniform contact between the solids and oxygen from the gas.

As mixed liquor is introduced into the fourth stage 16 of the sewage treatment system, a portion of the mixed liquor in the fourth stage flows out of the normal flow path 34, under the baffle 26 and into the first quiescent zone 18 of the first stage of the two stage clarifier apparatus. A substantial portion of the biological sludge, or other solid particulate matter, in the mixed liquor settles to the bottom of the quiescent zone 18 and reenters the flow path 34 in the fourth stage of the sewage treatment system for further biological treatment. The supernatant in the upper portion of the quiescent zone 18 thereby becomes a partially clarified effluent. As best shown in FIGS. 1, 2 and 3, baffle 26 may be provided with a baffle extension 93 at its lower edge which is downwardly, inwardly sloped with respect to quiescent zone 18 to provide a settling plate surface 94 for assisting in the settling of solids from mixed liquor in the quiescent zone. The baffle 26 and the baffle extension 93 may be supported in the first tank means by support members 98 or by other suitable means.

As mixed liquor is introduced into the fourth stage 16 of the sewage treatment system, a corresponding amount of partially clarified effluent is withdrawn from the first quiescent zone 18 through weir 62 and is transferred into the first aeration zone 44 of the second stage of the clarifier apparatus.

Liquids and any solids in the first aeration zone 44 are maintained in continuous movement in the flow path indicated by arrows 52 due to the action of oxygen containing gas dispersed into the liquid through nozzles 56 and to the flow path guidance provided by baffle 42 and by second tank means sidewall 38. A sufficient amount of oxygen containing gas is supplied to the first aeration zone of the clarifier apparatus to maintain any solids in substantially uniform suspension in the liquid in the aeration zone and to provide substantially constant, uniform contact between the solids and oxygen from the gas. Since there is no raw organic matter in the aerobic environment of the first aeration zone, any biological solids in the liquid of the aeration zone become cannabalistic, undergo autodigestion or are subject to consumption by higher organisms in the food chain, as more fully disclosed in U.S. Pat. No. 4,142,975. Thus, any biological solids in the partially clarified effluent in the first aeration zone undergo further biological treatment at this stage of the clarifier apparatus.

As partially clarified effluent is introduced into the first aeration zone 44, a portion of the partially clarified effluent in the first aeration zone flows out of the normal flow path 52, under baffle 42 and into the second quiescent zone 46 of the second stage of the clarifier apparatus. Any remaining biological sludge, or other solid particulate matter, in the partially clarified effluent settles to the bottom of the second quiescent zone 46 and reenters the flow path 52 in the first aeration zone to undergo further biological treatment. The supernatant in the upper portion of the second quiescent zone thereby becomes a fully clarified effluent. As best shown in FIGS. 1, 2 and 4, baffle 42 may be provided with a baffle extension 95 at its lower edge which is sloped downwardly and inwardly with respect to the second quiescent zone 46 to provide a settling plate surface 96 for assisting in the settling of solids from partially clarified effluent in the second quiescent zone. The baffle 42 and the baffle extension 95 may be supported in the second tank means by support members 99 or by other suitable means.

As partially clarified effluent is introduced into first aeration zone 44, a corresponding amount of fully clarified effluent is withdrawn from the second quiescent zone 46 through weir 72 and is transferred out of the clarifier apparatus through conduit 78, as indicated by arrow 97, for suitable disposal.

In the event that an undesirably large amount of solids should accumulate in the first aeration zone 44, a portion of the partially clarified effluent and accumulated solids may be intermittantly or continually removed from the second stage of the clarifier apparatus through airlift inlet 82 and recycled back to the fourth stage 16 of the sewage treatment system through outlet 84.

While the inventive concepts have been described in association with a presently particularly preferred and illustrative embodiment of the two stage clarifier apparatus, it is contemplated that various modifications may be apparent from the disclosure. For example, although the invention has been described as used in association with a four stage extended oxidation sewage treatment system, it is apparent that the inventive concepts may be readily modified for use in association with other types of systems. Such modifications are intended to be within the scope of the appended claims, except insofar as precluded by the prior art.

What is claimed is:

1. A clarifier apparatus for use in connection with a sewage treatment system to separate biological solids from mixed liquor in the system to produce a clarified effluent, comprising:

a sewage treatment system fluidly communicating with said clarifier first tank means defining a first quiescent zone, inlet means for supplying mixed liquor from the sewage treatment system to the first quiescent zone, second tank means defining a chamber, baffle means in the chamber for separating the chamber into an aeration zone and a second quiescent zone, gas supply means for supplying an oxygen containing gas to a lower portion of the aeration zone, first fluid communication means for withdrawing partially clarified effluent from an upper portion of the first quiescent zone and supplying the partially clarified effluent to the aeration zone in the treatment chamber of the second tank means, second fluid communication means providing fluid communication between the aeration zone and the second quiescent zone, and outlet means for withdrawing clarified effluent from an upper portion of the second quiescent zone.

2. The apparatus of claim 1 wherein the gas supply means comprises diffuser means for diffusing the gas into mixed liquor in the aeration zone, blower means for supplying the gas under pressure to the diffuser means, and conduit means providing fluid communication between the blower means and the diffuser means.

3. The apparatus of claim 1 which further comprises transfer means for transferring a portion of the partially clarified effluent from a lower portion of the aeration zone to the sewage treatment system.

4. The apparatus of claim 3 wherein the transfer means comprises an airlift pump having an inlet in a lower portion of the aeration zone and an outlet in the sewage treatment system.

5. The apparatus of claim 1 wherein the first fluid communication means comprises a first weir mounted in the first tank means at about the upper liquid level therein and conduit means providing fluid communication between the first weir and the aeration zone in the second tank means.

6. The apparatus of claim 1 wherein the outlet means comprises a second weir mounted in the second quiescent zone at about the upper liquid level therein and conduit means providing fluid communication out of the second aeration zone.

* * * * *